(12) United States Patent
Dhaka et al.

(10) Patent No.: US 12,341,567 B2
(45) Date of Patent: Jun. 24, 2025

(54) SYSTEM AND METHOD FOR IDENTIFICATION AND MITIGATION OF COVERAGE OVERLAP

(71) Applicant: RAKUTEN SYMPHONY, INC., Tokyo (JP)

(72) Inventors: Prithvi Raj Dhaka, Indore (IN); Prafull Johri, Indore (IN); Sudeep Jain, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/906,474

(22) PCT Filed: Jul. 6, 2022

(86) PCT No.: PCT/US2022/036187
§ 371 (c)(1),
(2) Date: Sep. 16, 2022

(87) PCT Pub. No.: WO2024/010574
PCT Pub. Date: Jan. 11, 2024

(65) Prior Publication Data
US 2024/0214092 A1    Jun. 27, 2024

(51) Int. Cl.
*H04W 24/10* (2009.01)
*H04B 17/23* (2015.01)
*H04B 17/345* (2015.01)
*H04B 17/391* (2015.01)

(52) U.S. Cl.
CPC ........... *H04B 17/391* (2015.01); *H04B 17/23* (2015.01); *H04B 17/345* (2015.01); *H04W 24/10* (2013.01)

(58) Field of Classification Search
CPC .... H04B 17/391; H04B 17/23; H04B 17/345; H04W 24/10; H04W 16/18; H04W 24/02; H04J 11/0023; H04L 5/0035
See application file for complete search history.

(56) References Cited

U.S. PATENT DOCUMENTS

| | | |
|---|---|---|
| 6,188,894 B1 * | 2/2001 | Clancy .................. H04W 16/18 455/63.2 |
| 2020/0120097 A1 * | 4/2020 | Amitay ................... H04L 67/52 |

* cited by examiner

*Primary Examiner* — Chuong A Ngo
(74) *Attorney, Agent, or Firm* — HAUPTMAN HAM, LLP

(57) ABSTRACT

A method includes receiving inputs that include geo-located data collected over a period for a plurality of cells in a radio access network; mapping the geo-located data to one or more polygons displayed through a GUI on a user interface, the interference polygons being layered above a display of a geo-location; determining a dataset of each cell included in each interference polygon displayed through the GUI; determining a total number of user samples included in each interference polygon; determining a number of user samples for each cell included in each interference polygon; in response to a first cell including less than or equal to a first threshold of the total number of user samples, determining whether the first cell is an over-shooter cell; and in response to the first cell including greater than the first threshold of the total number of user samples, determining whether the first cell is misaligned.

20 Claims, 8 Drawing Sheets

– 1 –

SYSTEM AND METHOD FOR IDENTIFICATION AND MITIGATION OF COVERAGE OVERLAP

RELATED APPLICATIONS

The present application is a National Phase of International Application No. PCT/US2022/036187, filed Jul. 6, 2022.

TECHNICAL FIELD

This description relates to an identification and mitigation of courage overlap system and method of using the same.

BACKGROUND

A cellular network is a telecommunication system of mobile devices (e.g., mobile phone devices) that communicate by radio waves through a local antenna at a cellular base station (e.g., cell tower). The coverage area in which service is provided is divided into small geographical areas called "cells". Each cell is served by a separate low power multi-channel transceiver and antenna at the cell tower. Mobile devices within a cell communicate through that cell's antenna on multiple frequencies and on separate frequency channels assigned by the base station from a common pool of frequencies used by the cellular network.

A radio access network (RAN) is part of the telecommunication system and implements radio access technology. RANs reside between a device such as a mobile phone, a computer, or remotely controlled machine and provides connection with a core network (CN). Depending on the standard, mobile phones and other wireless connected devices are varyingly known as user equipment (UE), terminal equipment, mobile station (MS), and the like.

SUMMARY

In some embodiments, a method includes receiving inputs that include geo-located data collected over a period for a plurality of cells in a radio access network (RAN); mapping the geo-located data to one or more interference polygons displayed through a graphical user interface (GUI) on a user interface (UI), the interference polygons being layered above a display of a geo-location; determining a dataset of each cell included in each interference polygon displayed through the GUI; determining a total number of user samples included in each interference polygon; determining a number of user samples for each cell included in each interference polygon; in response to a first cell including less than or equal to a first threshold of the total number of user samples, determining whether the first cell is an over-shooter cell; and in response to the first cell including greater than the first threshold of the total number of user samples, determining whether the first cell is misaligned.

In some embodiments, an apparatus, including a processor; and a memory having instructions stored thereon that, when executed by the processor, cause the apparatus to receive inputs that include geo-located data collected over a period for a plurality of cells in a radio access network (RAN); map the geo-located data to one or more interference polygons displayed through a graphical user interface (GUI) on a user interface (UI), the interference polygons being layered above a display of a geo-location; determine a dataset of each cell included in each interference polygon displayed through the GUI; determine a total number of user samples included in each interference polygon; determine a number of user samples for each cell included in each interference polygon; in response to a first cell including less than or equal to a first threshold of the total number of user samples, determine whether the first cell is an over-shooter cell; and in response to the first cell including greater than the first threshold of the total number of user samples, determine whether the first cell is misaligned.

In some embodiments, a non-transitory computer readable medium having instructions stored thereon that, when executed by a processor, cause an apparatus to receive inputs that include geo-located data collected over a period for a plurality of cells in a radio access network (RAN); map the geo-located data to one or more interference polygons displayed through a graphical user interface (GUI) on a user interface (UI), the interference polygons being layered above a display of a geo-location; determine a dataset of each cell included in each interference polygon displayed through the GUI; determine a total number of user samples included in each interference polygon; determine a number of user samples for each cell included in each interference polygon; in response to a first cell including less than or equal to a first threshold of the total number of user samples, determine whether the first cell is an over-shooter cell; and in response to the first cell including greater than the first threshold of the total number of user samples, determine whether the first cell is misaligned.

BRIEF DESCRIPTION OF THE DRAWINGS

Aspects of the present disclosure are best understood from the following detailed description when read with the accompanying FIGS. In accordance with the standard practice in the industry, various features are not drawn to scale. In some embodiments, dimensions of the various features are arbitrarily increased or reduced for clarity of discussion.

DETAILED DESCRIPTION

Figure 1:
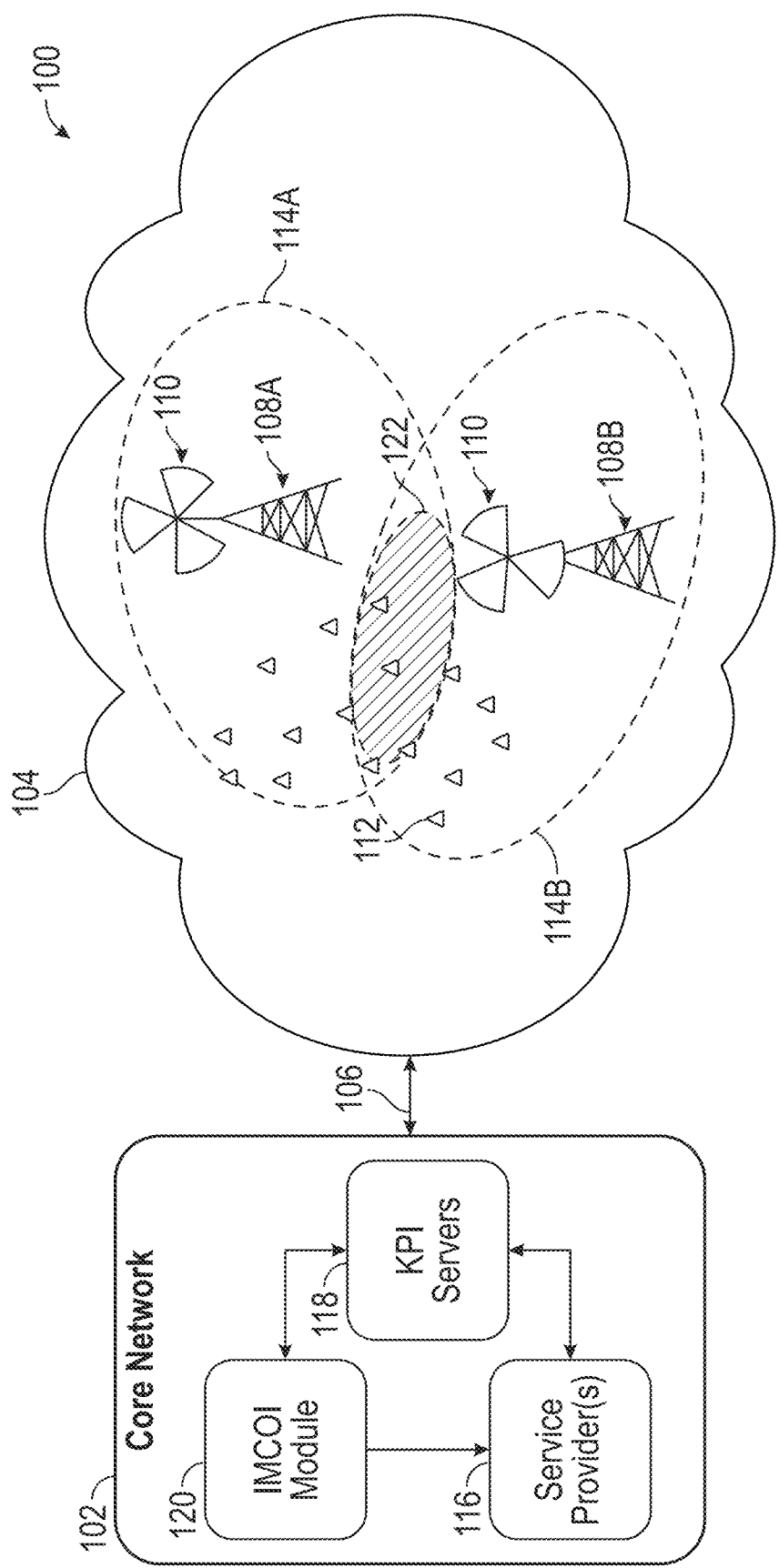
FIG. 1 is a diagrammatic representation of a system for identification and mitigation of coverage overlap issues (IMCOI), in accordance with some embodiments.

The following disclosure provides many different embodiments, or examples, for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a system and method for identification and mitigation of coverage overlap issues (IMCOI) in long-term evolution (LTE) networks is discussed. Currently no readily available solution geo-locates coverage overlap, further known as bad SINR areas, as well as the mitigation recommendation to optimize the network. In some embodiments, an IMCOI module is configured to geo-locate an area of overlap (e.g., area of interference) and mitigate the interference to improve the network key performance indicators (KPI's) and user experience. In some embodiments, an IMCOI module is configured to use UE measurements to pinpoint problem areas, in contrast to prediction tools used by other approaches.

A performance indicator or KPI is a type of performance measurement. KPIs evaluate the success of an organization or of a particular activity (such as projects, programs, products, and other initiatives within the scope of present embodiments) in which it engages. Often success is simply the repeated, periodic achievement of some levels of operational goal (e.g., zero defects, 10/10 customer satisfaction), and sometimes success is defined in terms of making progress toward strategic goals.

In some embodiments, the IMCOI system enables engineers to visualize the locality or problem area where customers suffer from the effects of overlapping interference and recommend the solution in terms of soft optimization (a dialog procedure of finding a satisfactory solution, a type of interactive method) is proposed and presented on examples which improves the network performance and user experience (UX).

The UX is how a user interacts with and experiences a product, system, or service. UX includes a person's perceptions of utility, ease of use, and efficiency. Improving UX is considered when most companies, designers, and creators are creating and refining products because negative user experience diminishes the use of the product and, therefore, any desired positive impacts.

In some embodiments, a cost saving solution is discussed as engineers are no longer sent into the field to diagnose or implement changes at the base station. Further, soft mitigation (e.g., measures that encompass non-technical mitigation measures used to counter interference) enables engineers to change a network parameter with a single click and monitor the post-change KPIs as well to ensure the improvement.

In some embodiments, interference polygons are created based on pre-defined reference signal received power (RSRP) and signal-to-interference-plus-noise ratio (SINR) threshold using user KPI measurements. RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns).

SINR is a quantity used to give theoretical upper bounds on channel capacity (or the rate of information transfer) in wireless communication systems. Analogous to the signal-to-noise ratio (SNR) used often in wired communications systems, the SINR is defined as the power of a certain signal of interest divided by the sum of the interference power (from all the other interfering signals) and the power of some background noise. Thus, a low SINR is indicative of increased or raised interference.

In some embodiments, cells are processed by an IMCOI algorithm and are labeled in various interference categories such as over-shooting (a cell will have over-shooting problems when the cell is detected at distances much larger than the planned coverage area), misaligned (misalignment of the antenna is caused by environmental conditions, wear and tear of mounts, and obstruction in the path of two stations), and overlapping (cell overlap is the situation in which a cell is detected as a possible server outside its expected coverage area and inside the coverage area of a neighbor cell). In some embodiments, cells contributing to interference polygons are run separately for overlap identification and mitigation. In some embodiments, interference polygons are converted into grids which are used to generate a flag matrix (where each grid within the interference polygon receives a positive or negative flag) for each contributing cell based on a nearest valid candidate search or IMCOI algorithm. In some embodiments, each cell includes N number of flags (where N is a non-negative integer) and based on whether the cell has a majority of negative flagged grids (vs. positive flags), mitigation recommendation is provided.

In some embodiments, in response to a high-usage cell, a suitable neighbor cell is tagged as a dominant server in the respective area based on pre-defined criteria. In some embodiments, the dominant server in the respective area is identified in an Excel report based on pre-defined criteria which is available periodically (e.g., every Monday).

In some embodiments, the IMCOI system is applied individually for 2G/3G/4G/5G and flexible RANs to adjust the parameters where engineers (having admin access) fine tune the IMCOI algorithm from the frontend. In software engineering, the terms frontend and backend (or sometimes referred to as back end or back-end) refer to the separation of concerns between the presentation layer (frontend), and the data access layer (backend) of a piece of software, or the physical infrastructure or hardware.

Network quality degradation through interference is commonly caused by the overlap coverage of multiple cells in the same location. The interference creates issues such as call dropping, UE handover failure, and throughput issues that result in negative customer quality of experience (QoE). While some overlapping of cells is desired for cell UE handover (the process of transferring an ongoing call or data session from one channel connected to the CN to another channel), overlap of multiple cells (e.g., greater than two) in the same location creates negative issues such as call dropping, UE handover failure, and throughput issues.

FIG. 1 is a diagrammatic representation of a system for identification and mitigation of coverage overlap issues (IMCOI) 100, in accordance with some embodiments.

IMCOI system 100 includes a CN 102 communicatively connected to RAN 104 through backhaul 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). Interference areas, such as interference area 122, exist in locations where geographic coverage cells 114 overlap, one or more cells 114 are misaligned, or one or more cells 114 are overshooting. CN 102 includes one or more service provider(s) 116, KPI servers 118, and IMCOI module 120.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between user equipment 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, backhaul portion 106 of IMCOI system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the Internet. The connection between base station 108 and UE 112 begins with backhaul 106 connected to CN 102. In some embodiments, backhaul 106 includes wired, fiber optic, and wireless components. Wireless sections include using microwave bands, mesh, and edge network topologies that use a high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, base stations are replaced with other edge devices configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc is 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 822 (FIG. 8), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In at least one embodiment, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate. Coverage depends on several factors, such as orography (i.e., mountains) and buildings, technology, radio frequency and perhaps most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal.

Service provider(s) 116 are businesses, vendors, or organizations that sell bandwidth or network access by providing direct Internet backbone access to Internet service providers and usually access to network access points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

KPI servers 118 produce both predictions and live network data. Live-network data (KPIs, UE/cell/MDT (minimization of drive test) traces, and crowdsourced data) allows for modelling of network traffic, hot-spot identification, and radio signal propagation. RF drive testing is a method of measuring and assessing the coverage, capacity, and Quality of Service (QoS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber experiences in an area, wireless carriers make directed changes to networks that provide better coverage and service to customers. Drive testing commonly is configured with a mobile vehicle outfitted with drive testing measurement equipment. The equipment is usually highly specialized electronic devices that interface to original equipment manufacturer (OEM) mobile handsets (UEs). This ensures measurements are realistic and comparable to actual user experiences. For mobile networks, crowdsourcing methodology leverages a crowd of participants (e.g., the mobile subscribers) to gather network measurements, either manually or automatically through mobile apps, or directly from the network using call traces.

UE/cell/MDT traces collected at the operations support systems (OSS) or through dedicated tools provide service provider(s) 116 with user-level information. Once geo-located, UE/cell/MDT traces are used to enhance path-loss calculations and prediction plots, as well as to identify and locate problem areas and traffic hotspots. KPI servers 118 allow service provider(s) 116 to use UE/cell/MDT traces along with IMCOI module 120 for network optimization.

Figure 8:
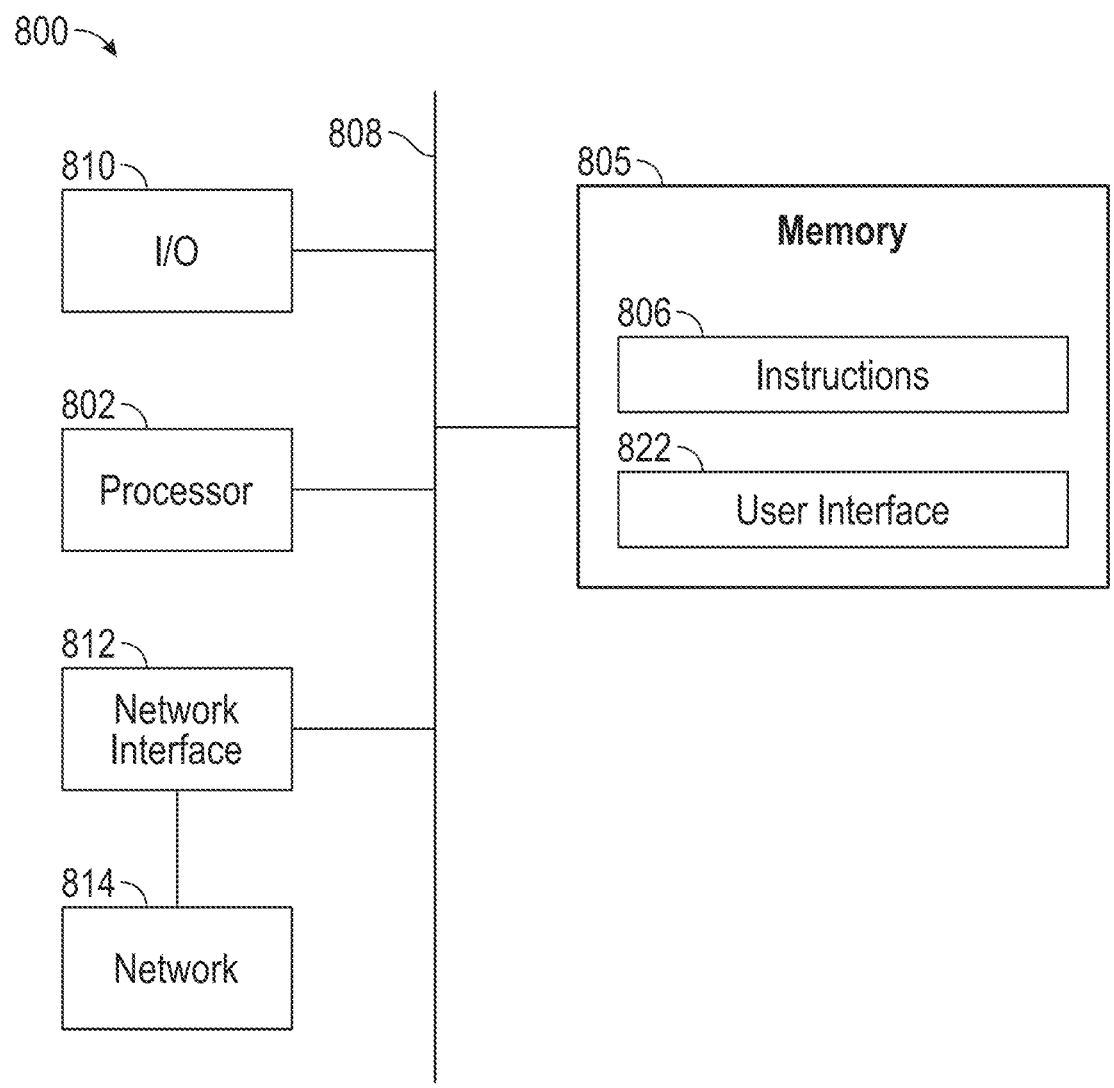
FIG. 8 is a high-level functional block diagram of a processor-based system, in accordance with some embodiments.

In some embodiments, IMCOI module 120 identifies interference areas, such as interference area 122. In some embodiments, IMCOI module 120 gathers geo-located sample data. In some embodiments, this geo-located data is provided by KPI servers 118. In some embodiments, the geo-located sample data is provided by a database or memory, such as memory 805 (FIG. 8). In some embodiments, the geo-located data includes serving ENodeB ID (i.e., the identifier of the node at the base station). In some embodiments, the geo-located data is provided and/or collected through drive testing, UE KPIs reported by the UE, such as UEs 112, base station KPI reporting through central units (CU) or distribution units (DU) associated with a base station, such as base stations 108, or other suitable methods of collecting geo-located data in accordance with some embodiments.

In some embodiments, IMCOI module 120 gathers new radio evolved absolute radio-frequency channel number (NR EARFCN). An absolute radio-frequency channel number (ARFCN) is a code that specifies a pair of reference frequencies used for transmission and reception in radio system. In a frequency division duplex (FDD) system one ARFCN number is used for downlink and another for uplink as downlink and uplink frequencies are different. In a time division duplex (TDD) system one ARFCN number is used as downlink and uplink frequency remains the same. The term ARFCN originated with GSM and evolved with the new technologies. For example, UARFCN for UMTS/WCDMA, EARFCN for E-UTAR/LTE and NR-ARFCN for 5G/New Radio. NR-ARFCNs for 5G new radio are defined in 3GPP specification 38.101-1 and 38.101-2, both of which are incorporated by reference in entirety.

In some embodiments, IMCOI module 120 gathers the physical cell ID (PCI). PCI used to indicate the physical layer identity of a cell. The PCI is used for cell identity during the cell selection procedure. The purpose of PCI optimization is to ensure to a great extent that neighboring cells have different primary sequences allocated. Good PCI assignment reduces call drops by enabling UEs to clearly distinguish one cell from another.

In some embodiments, IMCOI module 120 gathers the latitude and longitude of the node (e.g., eNB) or base station 108. In some embodiments, IMCOI module 120 gathers the reference signal received power (RSRP). RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns). In some embodiments, the RSRP is obtained from KPI servers 118.

In some embodiments, IMCOI module 120 gathers the reference signal received quality (RSRQ). RSRQ is used in 5G new radio (NR) networks to determine the quality of the radio channel. RSRQ, unlike RSRP (desired signal strength), further includes interference level due to the inclusion of received signal strength indicator (RSSI) in the calculation. RSRQ is further used for cell selection and handover, in response to the RSRP being insufficient RSRQ is defined using equation (1).

$$RSRQ = \frac{(N \cdot RSRP)}{RSSI} \qquad \text{eq. (1)}$$

RSSI is wide band power including signal power from a serving cell, co-channel neighbor cell, and interference from other cells interference and noise. RSRQ is the purity of the reference signal (RS) across the system bandwidth. RSRQ is a calculated value from RSRP and RSSI and is a measure of signal and interference. As RSRQ is a ratio of two signal powers with same unit i.e., dBm so RSRQ uses dB as a measurement unit. The best value of RSRP is about −3 dB and worst value can be −19.5 dB.

In some embodiments, IMCOI module 120 geo bins collected data. As the data collection occurs, IMCOI module 120 performs a binning operation on the collected data. In some embodiments, IMCOI module 120 obtains the mean of the values in a predetermined region, such as in a 50 meter by 50-meter grid. In some embodiments, IMCOI module 120 determines the edges (e.g., NW, SW, NE & SE) of a geographic area, divides the geographic area into 50×50-meter grids, looks up values within each grid, computes an average (mean), and attributes the mean to the latitude and longitude at the center of the grid.

In some embodiments, IMCOI module 120 determines a list of interferers. In some embodiments, a graphic user interface (GUI) displays, on a UI, the geo binning data allowing a user or service provider to visualize the interference geographically. In some embodiments, IMCOI module 120 allows an engineer or network operator to simulate network changes and the interference impact of these changes, i.e., antenna tilting, powering down, beam forming, beam selection, and other suitable modifications in accordance with some embodiments.

In some embodiments, system optimizations tasks are based on correct adjusting tilts, or the inclination of the antenna in relation to an axis. With the tilt, irradiation is directed further down (or higher), concentrating the energy in the new desired direction. In response to an antenna being tilted down, the term down-tilt is the most common used. In response to the inclination being up the term is up-tilt. The tilt is used to reduce interference and/or coverage in some areas, having each cell to meet a designed area.

Figure 2:
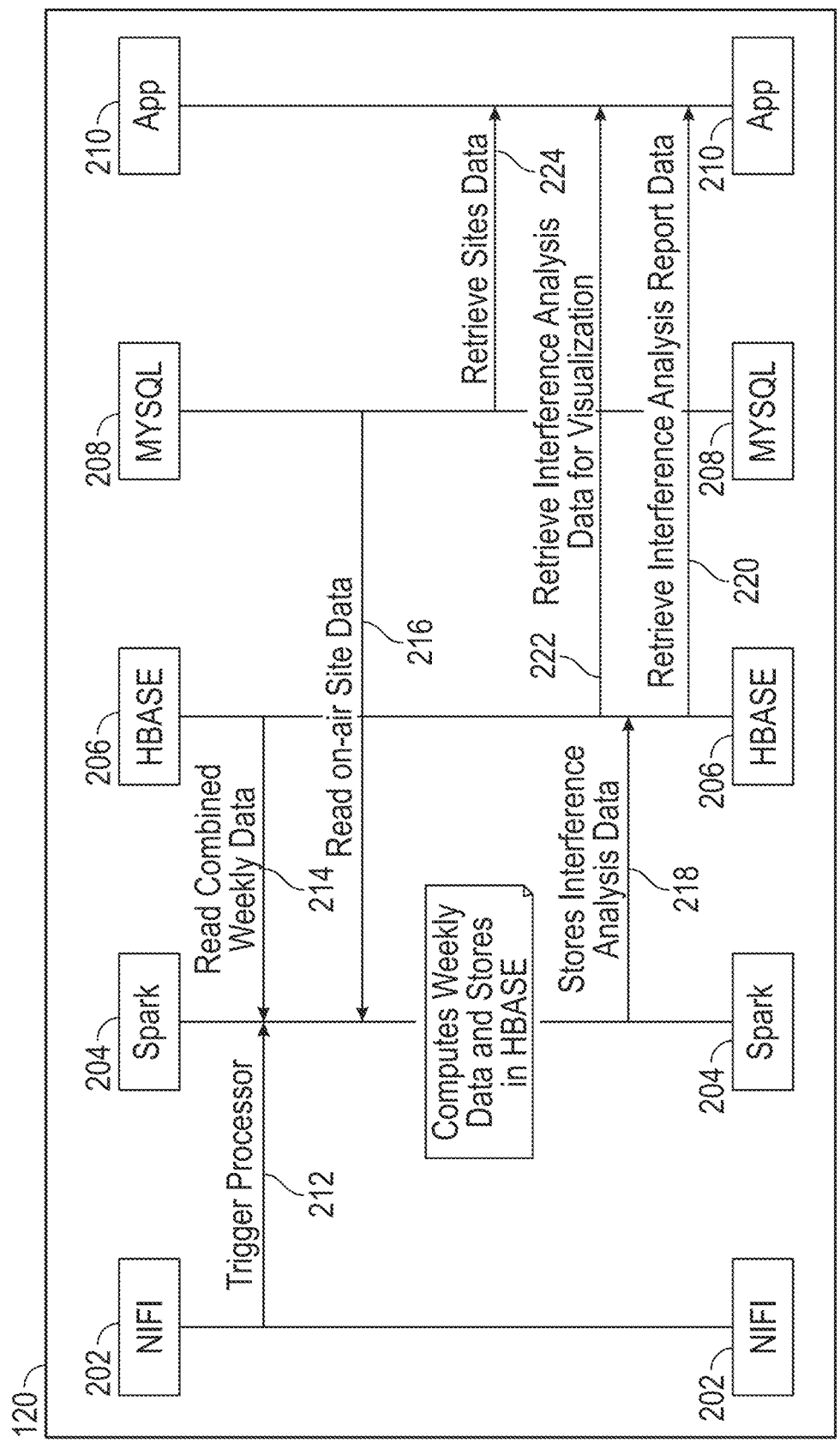
FIG. 2 is a data flow diagram of a IMCOI module, in accordance with some embodiments.

FIG. 2 is a data flow diagram of a IMCOI module 120, in accordance with some embodiments.

IMCOI module 120 includes a NIFI component 202, a Spark component 204, an Hbase-component 206, a MySQL component 208, and an Application component 210.

In some embodiments, NIFI-component 202 automates the flow of data between IMCOI module 120 and KPI servers 118. NIFI-component 202 ingests data from third party applications, the data including latitude and longitude for each base station, such as base station 108, frequency band details, eNB ID, E-UTRAN global identifier (ECGI), drive test data, KPIs, and other suitable data in accordance with some embodiments. In some embodiments, NIFI-component 202 is an open-source platform based on the concept of extract, transform, and load. The software design is based on the flow-based programming model and offers features that include the ability to operate within clusters, security using transport layer security (TLS) encryption, extensibility (e.g., users write their own software to extend abilities) and improved usability features like a portal which is used to view and modify behavior visually. NIFI-component 202 is used to schedule jobs, trigger flow, and ingest data from third-party applications like raw files from KPI servers 118.

Spark-component 204 is an open-source unified analytics engine for large-scale data processing. Spark-component 204 provides an interface for programming entire server clusters with implicit data parallelism and fault tolerance. Spark-component 204 is a parallel processing framework for running large-scale data analytics applications across clustered computers. Spark-component 204 handles both batch and real-time analytics and data processing workloads.

Hbase-component 206 provides a fault-tolerant way of storing large quantities of sparse data (e.g., small amounts of information caught within a large collection of empty or unimportant data). Hbase-component 206 is a column-oriented non-relational database management system that runs on top of a Hadoop Distributed File System (HDFS). HBase provides a fault-tolerant way of storing sparse data sets, which are common in many big data use cases.

HDFS-component (not shown) is a distributed filesystem that stores data on commodity machines, providing high aggregate bandwidth across server clusters. All batched data sources are initially stored into HDFS-component and then processed using Spark-component 204. Hbase-component 206 further utilizes HDFS as its data storage infrastructure.

MySQL-component 208 is an open-source relational database management system (RDBMS). A relational database organizes data into one or more data tables in which data types are related to each other and these relations help structure the data. MySQL component 208 creates, modifies, and extracts data from Spark-component 204 at operation 216, as well as controls user access. MySQL-component 208 is utilized for application programming interface (API) retrieval and for serving any real-time user interface (UI), such as UI 822 (FIG. 8). The aggregated and correlated data is further stored in MySQL.

Application component 210 allows a user, through a UI such as UI 822 of FIG. 8, to visualize the coverage overlap identification (e.g., retrieve interference analysis data for visualization) at operation 222. A user visualizes varying aspects of the IMCOI in real time including interference analysis report data at operation 220. In some embodiments, a user visualizes interference over specified bands and varying geographic areas. In some embodiments, a user visualizes individual grids (e.g., 50-meter×50-meter geographic areas) based on a coverage overlap analysis. For example, a user determines whether a grid (e.g., a 50-meter×50-meter geographic area) is experiencing poor coverage, whether any non-serving cell within the grid is a critical interferer cell, whether the grid has a clearly dominate server cell, whether any non-serving cell has an interferer warning, or whether the internal interference is a handover area.

In some embodiments, a user drills down into details within the grid. In some embodiments, a user hovers over or clicks on a grid and a pop-up box reveals information such as cell ID, cell RSRP, cell median RSRP, cell RSRQ, and the number of cells within the grid.

At operation 212, spark component 204 retrieves third party data from NIFI component 202. In some embodiments, the inputted third-party data includes site information from a site database, such as a latitude and longitude of all cells in a RAN, frequency band details, eNB ID, ECGI, and other suitable information. In some embodiments, the inputted data additionally includes geo-located data, such as RF drive testing information, UE KPI data or other passively collected data. In some embodiments, the geo-located data is collected over a continually running window of time, such as 7 days. In some embodiments, the geo-located data is collected over greater than 7 days and in some embodiments the geo-located data is collected over less than 7 days. In some embodiments, the window of time for collection of geo-located data is controlled by a sliding window algorithm. In some embodiments, the collected data is collected in a FIFO (first in, first out) manner whereas new data is collected older data is removed (e.g., data greater than 7 days old).

Spark component 204 stores the geo-located data in Hbase component 206 and retrieves the stored data at operation 214 to perform an interference analysis. At operation 218, Spark component 204 stores the interference analysis in Hbase component 206. Continuing with operation 216, MySQL 208 retrieves site information from Spark component 204 and combines the site information for Application 210. Application 210, at operation 222, retrieves the interference analysis data from Hbase component 206 for visualization. Application component 210 further retrieves interference analysis report data at operation 220 for visualization.

Figure 3:
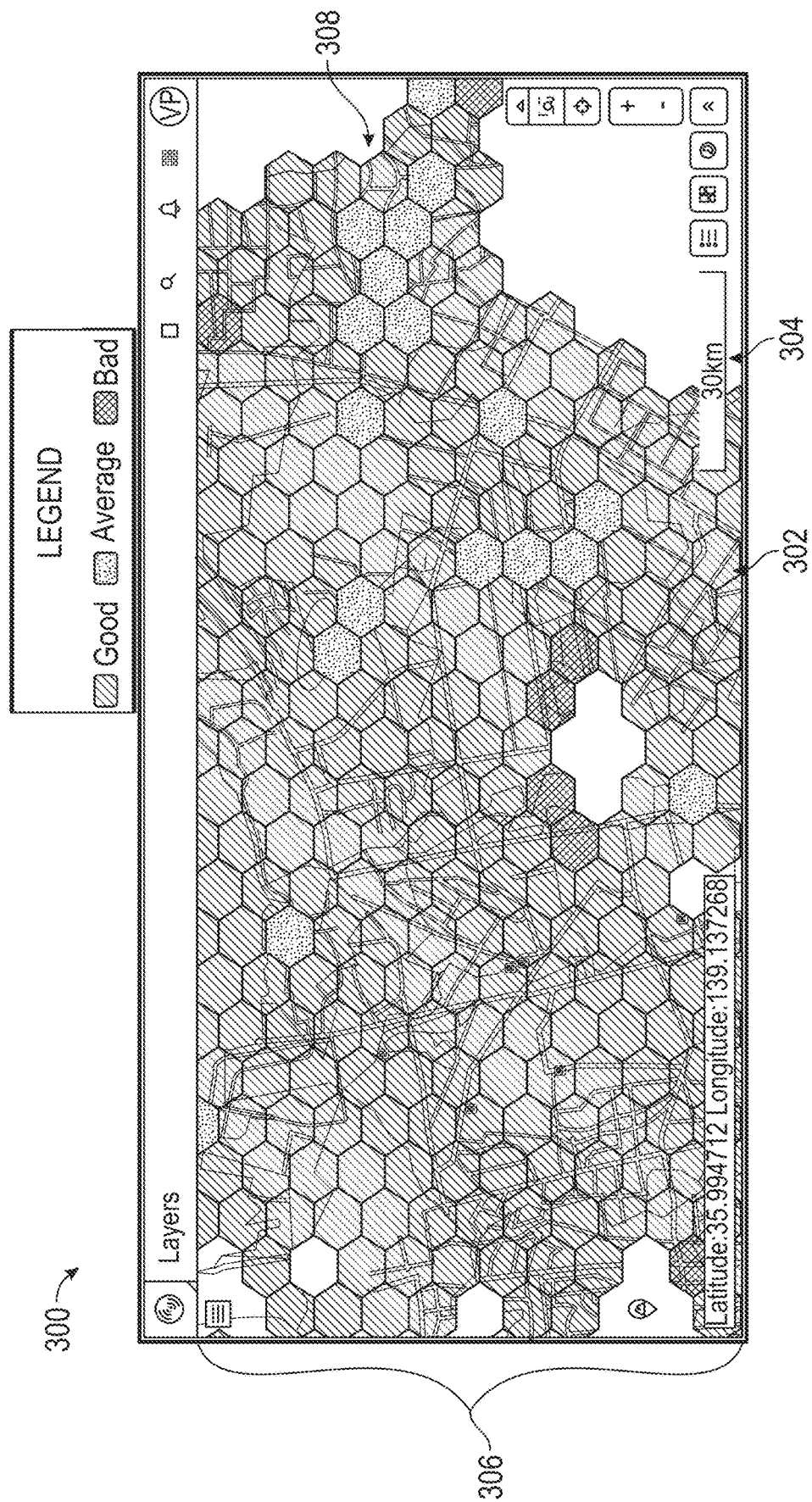
FIG. 3 is a pictorial representation of a geographic area with a hexagon pattern, in accordance with some embodiments.

FIG. 3 is a pictorial representation of a network visualization geographic area 300, in accordance with some embodiments.

Network visualization geographic area 300 is a representation of the collected data presented by the application discussed above. Network visualization geographic area 300 is divided into hexagons 302 where, in some embodiments, each hexagon 302 represents a geographic area based on scale 304 of network visualization geographic area 300. Network visualization geographic area 300, including hexagons 302, are layered over map 308, which represents a geographic area of interest. In some embodiments, the hexagons 302 combine to form a hexagon pattern 306. In some embodiments, hexagons 302 are configured with varying sizes and provide information relating to network coverage quality (e.g., as good, average, or bad). In some embodiments, the size of hexagons 302 are adjustable by an engineer or user. In some embodiments, hexagons 302 have varying shapes including circular, square (similar to the 50 meter×50 meter grids), and rectangular. In some embodiments, a user selects an alternate shape of hexagons 302. In some embodiments, the area of hexagons 302 are based on a level of zoom into network visualization geographic area 300.

Figure 4:
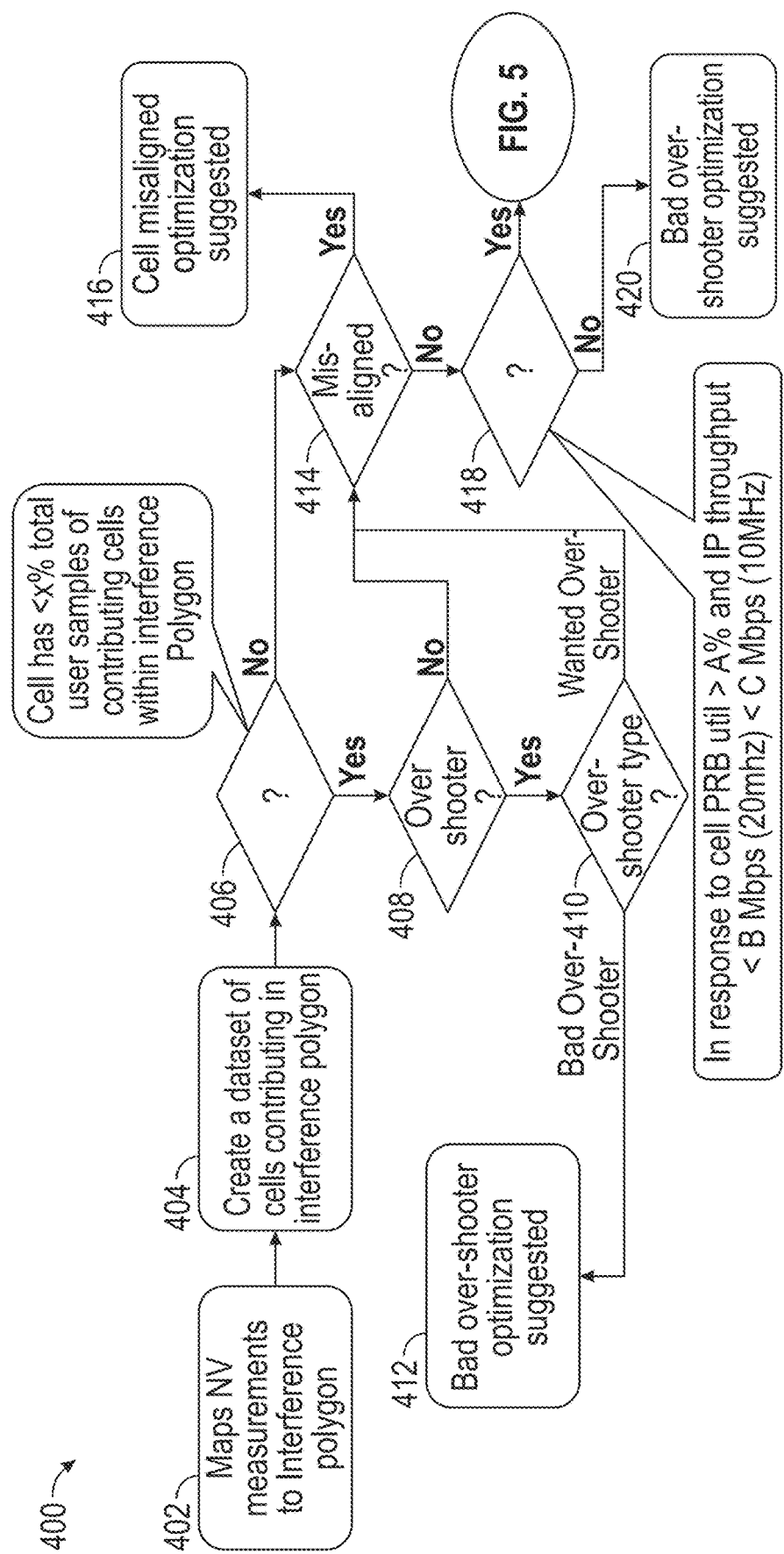
FIG. 4 is a flow diagram representation of a method for IMCOI, in accordance with some embodiments.

FIG. 4 is a flow diagram representation of a method for identification and mitigation of coverage overlap issue (IMCOI) 400, in accordance with some embodiments.

While the operations of method 400 are discussed and shown as having a particular order, each operation in method 400 is configured to be performed in any order unless specifically called out otherwise. Method 400 is implemented as a set of operations, such as operations 402 through 420.

At operation 402 of method 400, network visualization measurements are mapped to interference polygons, such as hexagons 302. In some embodiments, interference polygons are created based on pre-defined RSRP & SINR thresholds using network visualization (NV) user measurements discussed above. In a non-limiting example, each KPI or other network measurement (as discussed above) corresponds with a latitude and longitude (through geo-binning, known location, or other suitable methods within embodiments of the disclosure). To continue with the non-limiting example, each polygon is further associated with multiple latitudes and longitudes corresponding to the polygon shape layered above a map, such as map 308. Thus, in operation 402, each KPI or other network measurement having a latitude and longitude that falls within a polygon, is mapped to this polygon and this operation is performed for each polygon. Process flows from operation 402 to operation 404.

At operation 404 of method 400, a dataset of cells contributing interference within each polygon is created. In a non-limiting example, each cell within a polygon that contributes towards interference of another cell is added to a dataset. In some embodiments, each cell is processed through the IMCOI algorithm of method 400. Process flows from operation 404 to operation 406.

At operation 406 of method 400, a determination is made as to whether each cell includes less than X % (where X is a non-negative integer) of the total user samples (e.g., UE samples) of all interference contributing cells in a polygon. That is, a determination is made as to whether a cell contributes a small (or very small) amount to the overall interference in the polygon. In some embodiments, the interference cells with less than X % (e.g., 5%) are considered small contributors to the interference and the large interference contributors are targeted with a higher priority. In response to less than X % of the total user samples coming from a contributing interference cell ("YES" branch of block 406), process flows from operation 406 to operation 408.

At operation 408 of method 400, a determination is made as to whether the cell is an over-shooter. An over-shooter is a cell whose signals were not intended to be received by another cell (e.g., the cell overshot a nominal range), typically occurring due to unusual ionospheric conditions. Overshooting exists in a signal from a given cell forming a discontinuous coverage area in another adjacent cell. In response to the cell being an over-shooter ("YES" branch of block 408), process flows from operation 408 to operation 410.

At operation 410 of method 400, a determination is made as to whether the over-shooter cell is a bad over-shooter or a wanted over-shooter. Remembering from above that while some overlapping of cells (including over-shoot) is desired for cell UE handover (the process of transferring an ongoing call or data session from one channel connected to the CN to another channel), overlap (including over-shoot) of multiple cells (e.g., greater than two) in the same location creates negative issues such as call dropping, UE handover failure, and throughput issues. Thus, a cell that is overshooting for handover purposes (a server cell) is labeled as a wanted over-shooter and a cell that is not considered for handover purposes (a non-server cell) is labeled as a bad over-shooter. (See Table 1 regarding overshooting cells shown below.) In response to the cell being a bad over-shooter ("BAD OVER-SHOOTER" branch of block 410), process flows from operation 410 to operation 412.

At operation 412 of method 400, the cell is identified in a coverage overlap report (shown in Table 1 below) as a bad over-shooter and optimization is recommended by IMCOI method 400. Thus, an engineer tasked with network coverage improvement is informed the identified cell is causing interference issues with other cells.

In response to the cell being a wanted over-shooter ("WANTED OVER-SHOOTER" branch of block 410), or in response to the cell not being an over-shooter ("NO" branch of block 408), or in response to equal or greater than X % of the total user samples coming from a contributing interference cell ("NO" branch of block 406), process flows from operation 402, 408, or 410 to operation 414.

At operation 414 of method 400, a determination is made as to whether the cell is misaligned. Misaligned is the condition of being out of correct position or improperly adjusted: bad or incorrect alignment. In response to the cell having alignment deviation of greater than 60 degrees, the cell is labeled a mis-aligned (see Table 1 misalignment). In response to the cell being determined to be misaligned, process flows from operation 414 to operation 416.

At operation 416 of method 400, the cell is labeled as misaligned in the coverage overlap report (Table 1) along with a recommendation for optimization. In response to the cell being determined to be in alignment ("NO" branch of block 414), process flows from operation 414 to operation 418.

At operation 418 of method 400, a determination is made as to whether the cell's physical resource block (PRB) utilization is greater than A % and throughput is less than B Mbps (at 20 MHz) or C Mbps (at 10 MHz) (where A, B, and C are non-negative integers). In LTE systems, the PRB usage ratio is used to manage the QoS of LTE traffic. As the PRB usage ratio increases, the resource is not allocated in a timely and reliable manner to the users of the cell. In communication networks, throughput is the rate of successful message delivery over a communication channel. Throughput is usually measured in bits per second (bit/s or bps), and sometimes in data packets per second (p/s or pps) or data packets per time slot.

In response to the cell PRB utilization being less than or equal to A % (e.g., 97%) and the throughput is greater than B Mbps (e.g., 100 Mbps) at 20 MHz or C Mbps (e.g., 50 Mbps) at 10 MHz ("NO" branch of block 418), process flows from operation 418 to operation 420. Thus, the resources of the cell are allocated in a timely and reliable manner to the users of the cell and the throughput remains above a predetermined threshold (e.g., the cell is operating well except for the interference the cell is creating). At operation 420, the cell is labeled as a bad over-shooter in the coverage overlap report (Table 1) and a recommendation for optimization is annotated.

Figure 5:
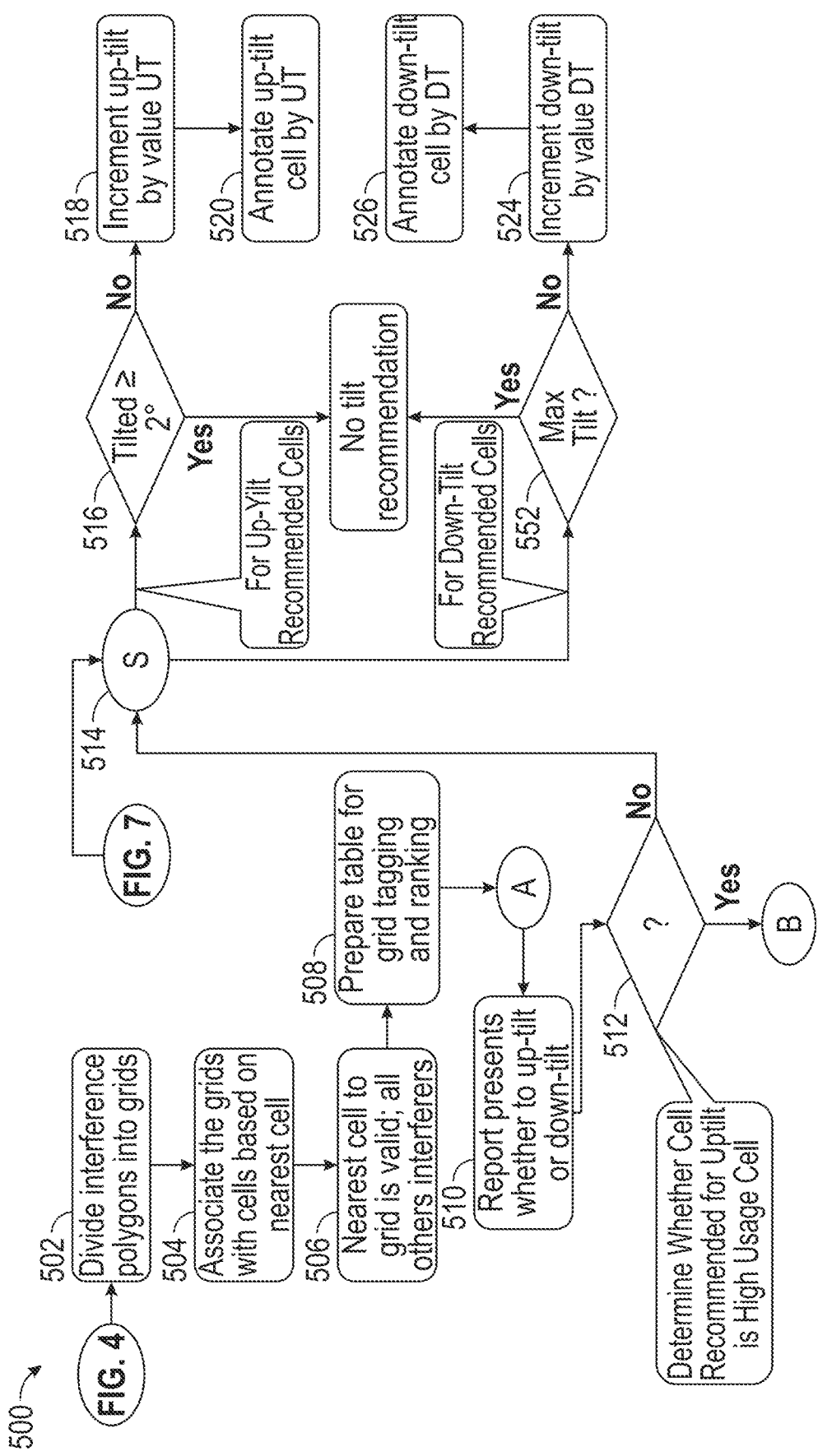
FIG. 5 is a flow diagram representation of a method for determining overlap, in accordance with some embodiments.

In response to the cell PRB utilization being greater than A % and the throughput is less than B Mbps at 20 MHz or C Mbps at 10 MHz ("YES" branch of block 418), process flows from operation 418 to operation 502 of overlap method 500 (FIG. 5).

FIG. 5 is a flow diagram representation of a method for determining overlap 500, in accordance with some embodiments.

While the operations of method 500 are discussed and shown as having a particular order, each operation in method 500 is configured to be performed in any order unless specifically called out otherwise. Method 500 is implemented as a set of operations, such as operations 502 through 534.

At operation 502 of method 500, interference polygons, such as hexagons 302, are further divided into grids. In some embodiments, each grid is square (e.g., 50-meter–50-meter). In some embodiments, by breaking the interference polygons into smaller grids (e.g., of 2,500 m²), IMCOI module 120 is configured to determine, with precision, where interference is occurring, which cell is causing the interference, and which cell is recommended for optimization. In some embodiments, cells contributing interference within the polygons are run separately for overlap identification and mitigation. In some embodiments, interference polygons are converted into grids which will be used to generate a flag matrix for each contributing cell based on the nearest valid cell candidate. Process flows from operation 502 to operation 504.

At operation 504 of method 500, IMCOI module 120 associates each of the grids with one or more cells based on which cell is nearest to the grid. In some embodiments, the cells are selected from the top N cells (where N is a non-negative integer). In some embodiments, the top N cells are those cells that are greater than or equal to X % of the total user samples of all contributing cells within an interference polygon (as determine in operation 406). In some embodiments, the term top N cells is based on the total number of samples captured in the interference polygon. In some embodiments, all cells are processed by the IMCOI algorithm of method 500 and not just the top N cells. Process flows from operation 504 to operation 506.

At operation 506 of method 500, IMCOI module 120 determines a cell which is nearest to the grid and the cell is treated as a valid candidate and the remaining cells are treated as interferer cells. The cell nearest to the grid is tagged as an up-tilt grid for the valid candidate and tagged as down-tilt for the interferer cells. In some embodiments, the nearest distance is measured from a centroid of the grid to the cell location as available in the database, such as Hbase-component 206. Process flows from operation 506 to operation 508.

At operation 508 of method 500, IMCOI module 120 creates a table (see Table 1) for each cell based on the grid tagging of operation 506. IMCOI further ranks the cells based on the number of up-tilt tags (e.g., the larger the number of up-tilt tags the higher the ranking) and the number of down-tilt tags (e.g., the larger the number of down-tilt tags, the lower the ranking). Process flows from operation 508 to operation 602 (FIG. 6).

Figure 6:
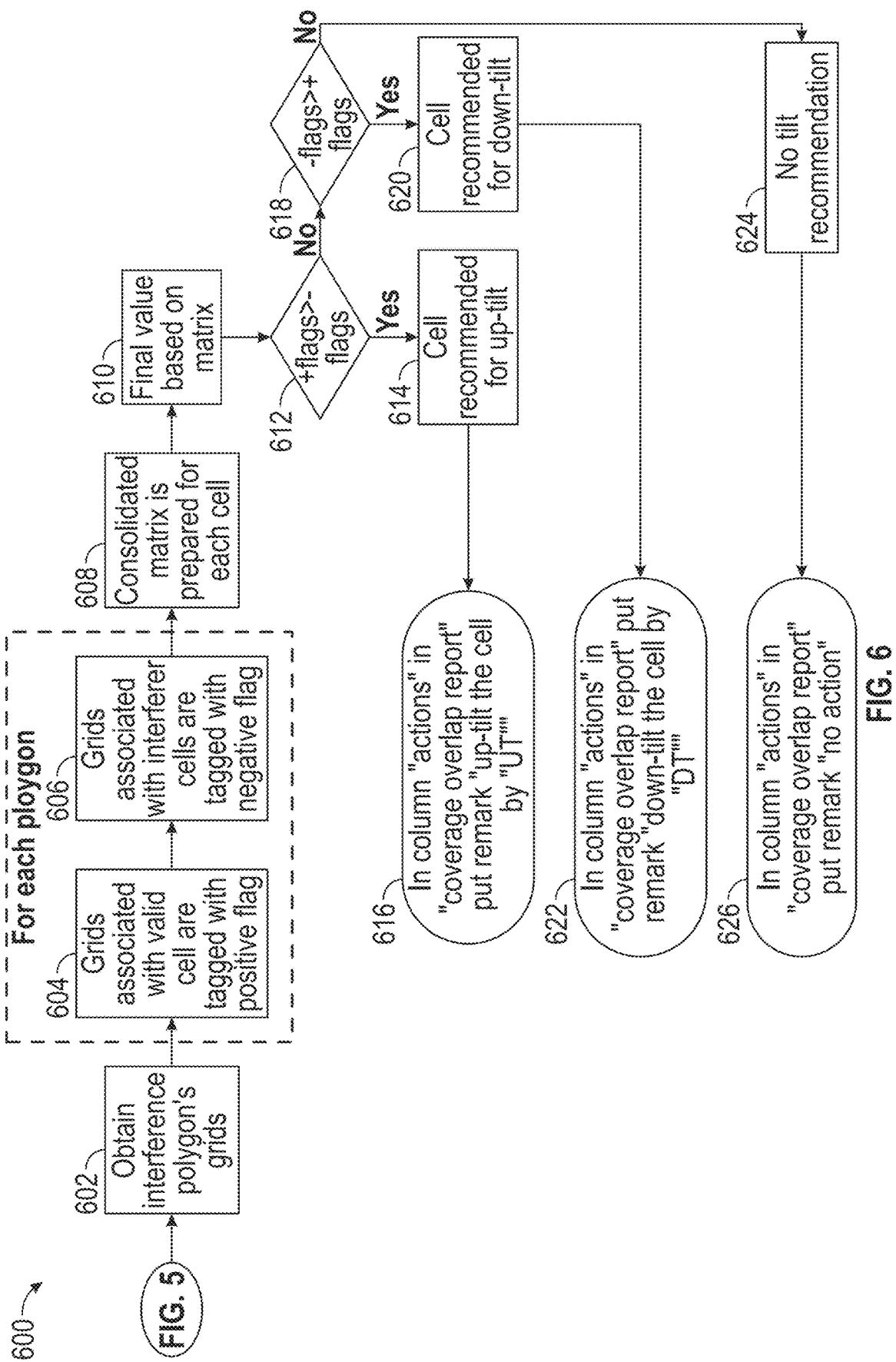
FIG. 6 is a flow diagram representation of a method for determining a tilt recommendation, in accordance with some embodiments.

FIG. 6 is a flow diagram representation of a method for determining a tilt recommendation 600, in accordance with some embodiments.

While the operations of method 600 are discussed and shown as having a particular order, each operation in method 600 is configured to be performed in any order unless specifically called out otherwise. Method 600 is implemented as a set of operations, such as operations 602 through 626.

At operation 602 of method 600, IMCOI module 120 obtains each interference polygon's grids (e.g., each of the grids within an interference polygon). Process flows from operation 602 to operation 604.

At operation 604 of method 600, each grid within each polygon associated with a valid candidate cell is tagged with a positive flag. Process flows from operation 604 to operation 606.

At operation 606 of method 600, each grid within each polygon associated with an interferer cell is tagged with a negative flag. In some embodiments, each cell includes M (where M is a non-negative number) number of flags where a mitigation recommendation is based on which flags are the majority. Process flows from operation 606 to operation 608.

At operation 608 of method 600, a consolidated matrix of all flagged grids is prepared for each cell (e.g., a flag matrix). Process flows from operation 608 to operation 610.

At operation 610 of method 600, a final flag value is determined based upon the consolidated matrix. Process flows from operation 610 to operation 612.

At operation 612 of method 600, a determination is made as to whether each cell had more positive or more negative flags. In response to a cell including more positive flags than negative flags ("YES" branch of block 612), process advances to operation 614 where the cell is recommended for up-tilt. Process flows from operation 614 to operation 616.

At operation 616 of method 600, an annotation is made in the actions column of the coverage overlap report to up-tilt the cell by UT. In some embodiments, UT is a step value for up-tilting the recommended cell. In some embodiments, UT is one degree. In some embodiments, UT is selected by an engineer, a predetermined value, or is based upon past tilt recommendations for the cell.

In response to a cell not including more positive flags than negative flags ("NO" branch of block 612), process advances to operation 618 where a determination is made as to whether the cell includes more negative flags than positive flags. In response to a cell including more negative flags than positive flags ("YES" branch of block 618), process advances to operation 620 where the cell is recommended for down-tilt. Process flows from operation 620 to operation 622.

At operation 622 of method 600, an annotation is made in the actions column of the coverage overlap report to down-tilt the cell by DT. In some embodiments, DT is a step value for down-tilting the recommended cell. In some embodiments, DT is one degree. In some embodiments, DT is selected by an engineer, a predetermined value, or is based upon past tilt recommendations for the cell.

In response to a cell including neither more negative flags nor positive flags ("NO" branch of block 618), process advances to operation 624 where the cell is recommended for no tilt. Process flows from operation 624 to operation 626.

At operation 626 of method 600, an annotation is made in the actions column of the coverage overlap report that there is no action to take. Process flows from operation 626, operation 622, or operation 616 to operation 510 (FIG. 5).

At operation 510 the coverage overlap report (Table 1) is annotated with each down-tilt grid and each up-tilt grid for each cell. Process flows from operation 510 to operation 512.

Figure 7:
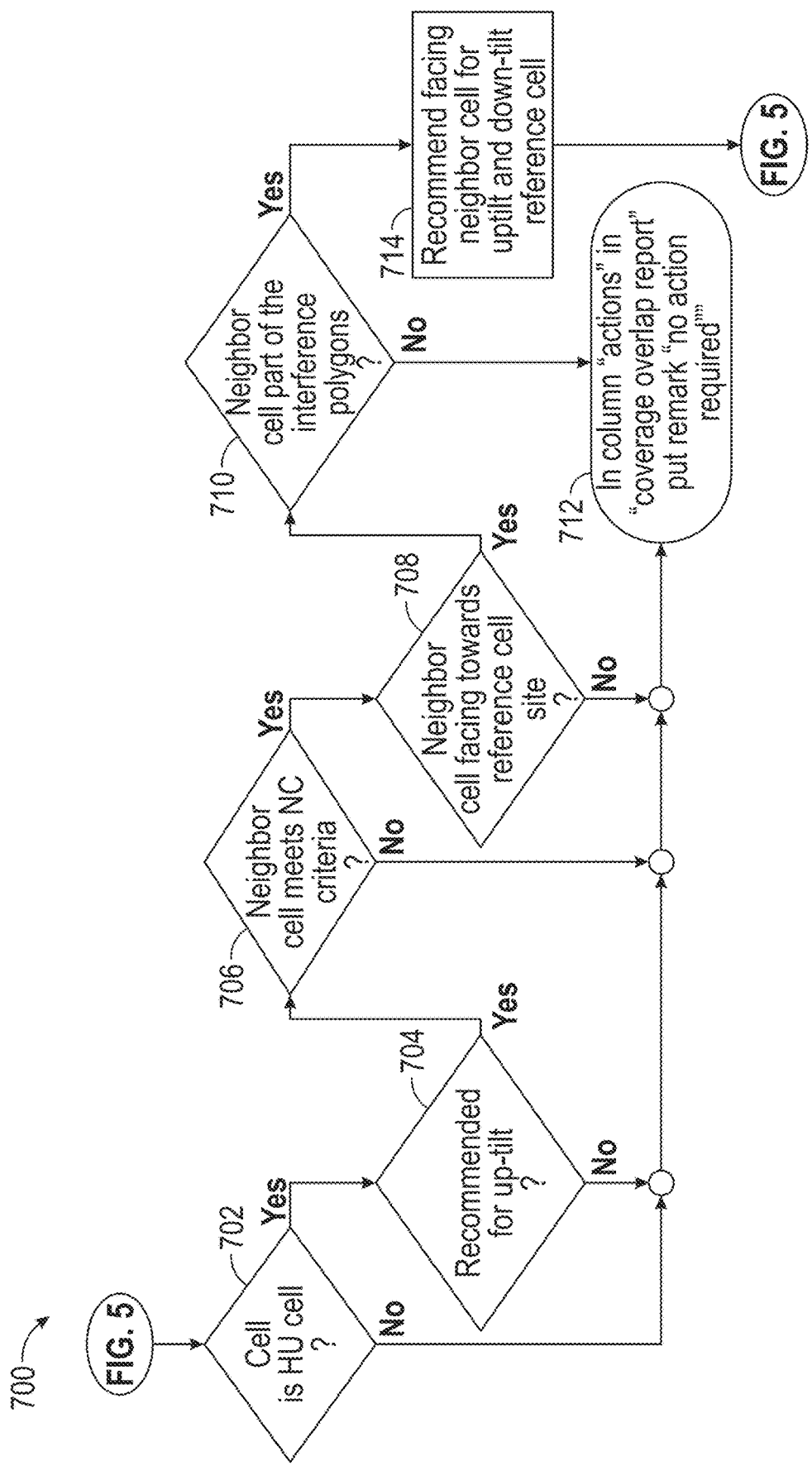
FIG. 7 is a flow diagram representation of a method for determining a tilt recommendation for a handover cell, in accordance with some embodiments.

At operation 512 of method 500, a determination is made as to whether the cell recommended for up-tilt is a high-usage (HU) cell at operation 512. In some embodiments, a HU cell is determined on the basis of high PRB utilization and is treated as high usage cell. In response to a cell recommended for up-tilt being a HU cell, process flows from operation 512 to operation 702 (FIG. 7).

TABLE 1

Sample Report

| Column Name | Business Rule |
|---|---|
| Network Region | Name of the respective Network Region |
| Network City | Name of the respective Network City |
| Municipality | Name of the respective municipality |
| District | Name of the respective district |
| Site Id | Respective Site Id |
| Cell Id | Respective Cell Id |
| Band | Band of the respective Cell |
| Current E-Tilt (Deg.) | Current E-Tilt of the Cell |
| Maximum Electrical Tilt (°) | Max. E-Tilt supported by the Cell |
| Mechanical Tilt (°) | Current M-Tilt of the Cell |
| Antenna Height (m) | Current Antenna Height of the Cell |
| Up-Tilt Grid Count | Total count of grid recommended for up-tilt for the respective cell |
| Down-Tilt Grid Count | Total count of grid recommended for down-tilt for the respective cell |
| Is Overshooting Cell? | Put "Yes", in response to the cell being marked as Overshooting in Overshooting Cells report. Otherwise put "No". |
| Is Mis-aligned Cell? | Put "Yes" in response to the cell having deviation >60 deg. or marked as Swapped in Mis-aligned Sector report. Otherwise put "No". |
| Proposed Incremental E-Tilt | Proposed incremental E-tilt in deg for the respective cell |
| Remarks | Actionable remark for the respective cell as: Cell is already having ≤2 degree tilt Up-tilt the cell by "UT" Down-tilt the cell by "DT" |

FIG. 7 is a flow diagram representation of a method for determining a tilt recommendation for a handover cell 700, in accordance with some embodiments.

While the operations of method 700 are discussed and shown as having a particular order, each operation in method 700 is configured to be performed in any order unless specifically called out otherwise. Method 700 is implemented as a set of operations, such as operations 702 through 714.

At operation 702 of method 700, a determination is made as to whether a cell is a HU cell. In response to the cell being a HU cell ("YES" branch of block 702), a determination is made as to whether the cell is recommended for up-tilt at operation 704.

In response to the cell being recommended for up tilt ("YES" branch of block 704), a determination is made as to whether a neighbor cell meets neighbor cell criteria (NCC) at operation 706. That is, up-tilting a HU cell further burdens an already high usage cell and lead to undesirable results. Therefore, method 700 determines whether a neighboring cell is able to support handovers and be uptilted in leu of uptilting the original cell. In some embodiments, the NCC includes the neighbor cell including handover attempts that are greater than 50% of the total handovers for the original cell. In a non-limiting example, in response to 1,000 total handovers for the original cell, the neighbor cell includes 501. The NCC further includes a determination as to whether the neighboring cell has a handover success rate (HOSR) of greater than 98% to ensure a high handover success rate. Finally, the NCC includes a determination that the neighboring cell is not a HU cell. In response to a neighboring cell including greater than handover attempts of greater than the total handovers for the HU cell, an HOSR of greater than 98%, and is a non-HU cell ("YES" branch of block 706), process flows to operation 708.

At operation 708 of method 700, a determination is made as to whether the neighboring cell faces the reference cell (e.g., the HU cell). In response to the neighboring cell facing the HU cell ("YES" branch of block 708), process flows to operation 710.

At operation 710 of method 700, a determination is made as to whether the neighboring cell is associated with an interference polygon. In response to the neighboring cell being part of an interference polygon ("YES" branch of block 710), a recommendation is made for the neighboring cell to be up-tilted and the reference (original HU) cell to be down-tilted. Process flows from operation 714 to operation 514.

In response to the reference (original) cell not being an HU cell ("NO" branch of block 702), the reference (original) cell not being recommended for up-tilt (("NO" branch of block 704, the neighboring cell not meeting the NCC ("NO" branch of block 706), the neighboring cell not facing towards the reference (original HU) cell ("NO" branch of block 708, or the neighboring cell not being a part of the interference polygons ("NO" branch of block 710), where the coverage overlap report is updated to annotate no action (no tilt) is to be taken on the cell at operation 712. Process flows from operation 712 to operation 514.

In response to a cell recommended for up-tilt not being a HU cell ("NO" branch of block 512, process flows to operation 514 where the up-tilted recommended cells and the down-tilted recommended cells are separated into two separate flow paths.

At operation 516 of method 500, a determination is made as to whether the cell is already titled greater than or equal to 2°. In response to the cell already being tilted greater than or equal to 2° ("YES" branch of block 516), a no-tilt recommendation is made for the cell in the coverage overlap report. In response to the cell already being tilted less than 2° ("NO" branch of block 516), process flows to operation 518.

At operation 518 of method 500, the up-tilt grid counter for the cell is incremented by UT. In some embodiments, the up-tilt is performed by 1°. Process flows from operation 518 to operation 520.

At operation 520 of method 500, the coverage overlap report is annotated to reflect the up-tilt performed in operation 518.

At operation 522 of method 500, a determination is made as to whether the cell is already at a maximum tilt. In response to the cell already being at a maximum tilt ("YES" branch of block 522), a no-tilt recommendation is made for the cell in the coverage overlap report. In response to the cell already being tilted less than a maximum ("NO" branch of block 522), process flows to operation 524.

At operation 524 of method 500, the down-tilt grid counter for the cell is incremented by DT. In some embodiments, the down-tilt is performed by 1°. Process flows from operation 524 to operation 526.

At operation 526 of method 500, the coverage overlap report is annotated to reflect the down-tilt performed in operation 524.

FIG. 8 is a block diagram of an identification and mitigation of coverage overlap issues (IMCOI) processing circuitry 800 in accordance with some embodiments. In some embodiments, IMCOI processing circuitry 800 is a general-purpose computing device including a hardware processor 802 and a non-transitory, computer-readable storage medium 804. Storage medium 804, amongst other things, is encoded with, i.e., stores, computer program code 806, i.e., a set of executable instructions such as IMCOI algorithm, such as methods 400, 500, 600 and 700. Execution of instructions 806 by hardware processor 802 represents (at least in part) an identification and mitigation of coverage overlap issues application which implements a portion, or all the methods described herein in accordance with one or more embodiments (hereinafter, the noted processes and/or methods).

Processor 802 is electrically coupled to a computer-readable storage medium 804 via a bus 808. Processor 802 is further electrically coupled to an I/O interface 810 by bus 808. A network interface 812 is further electrically connected to processor 802 via bus 808. Network interface 812 is connected to a network 814, so that processor 802 and computer-readable storage medium 804 connect to external elements via network 814. Processor 802 is configured to execute computer program code 806 encoded in computer-readable storage medium 804 to cause IMCOI processing circuitry 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause IMCOI processing circuitry 800 to be usable for performing a portion or all the noted processes and/or methods. In one or more embodiments, storage medium 804 further stores information, such as IMCOI algorithm which facilitates performing a portion or all the noted processes and/or methods.

IMCOI processing circuitry 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

IMCOI processing circuitry 800 further includes network interface 812 coupled to processor 802. Network interface 812 allows IMCOI processing circuitry 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more IMCOI processing circuitry 800.

IMCOI processing circuitry 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. IMCOI processing circuitry 800 is configured to receive information related to UI 822 through I/O interface 810. The information is stored in computer-readable medium 804 as user interface (UI) 822.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a method includes receiving inputs that include geo-located data collected over a period for a plurality of cells in a radio access network (RAN); mapping the geo-located data to one or more interference polygons displayed through a graphical user interface (GUI) on a user interface (UI), the interference polygons being layered above a display of a geo-location; determining a dataset of each cell included in each interference polygon displayed through the GUI; determining a total number of user samples included in each interference polygon; determining a number of user samples for each cell included in each interference polygon; in response to a first cell including less than or equal to a first threshold of the total number of user samples, determining whether the first cell is an over-shooter cell; and in response to the first cell including greater than the first threshold of the total number of user samples, determining whether the first cell is misaligned.

In some embodiments, the determination whether the first cell is the over-shooter cell further includes determining whether a second cell unintentionally received signals transmitted by the first cell; in response to the second cell unintentionally receiving signals transmitted by the first cell, determining a type of over-shooter for the first cell; and in response to the second cell not receiving signals transmitted by the first cell or receiving the signals from the first cell intentionally sent to the second cell, determining whether the first cell is misaligned.

In some embodiments, the determination the type of over-shooter for the first cell further includes determining whether the first cell is a handover cell; in response to the first cell being the handover cell, determining whether the first cell is misaligned; in response to the first cell not being the handover cell, identifying the first cell as a bad over-shooter; and recommending optimization of the first cell.

In some embodiments, the determination whether the first cell is misaligned further includes determining whether the first cell includes an alignment deviation of greater than 60 degrees; in response to the first cell including the alignment deviation of greater than 60 degrees, recommending optimization of the first cell; and in response to the first cell including the alignment deviation of less than or equal 60 degrees, determining whether a first cell physical resource block (PRB) is greater than a second threshold and an IP throughput is less than a third threshold or a fourth threshold.

In some embodiments, the determination the first cell PRB is greater than the second threshold and the IP throughput is less than the third or fourth threshold further includes in response to the first cell PRB being less than or equal to the first threshold and the IP throughput being greater than or equal to the third or fourth threshold, recommending first cell optimization; and in response to the first cell PRB being greater than the first threshold and the IP throughput being less than the third or fourth threshold, dividing the interference polygons into grids.

In some embodiments, the division of the interference polygons into the grids, further includes associating each grid with a nearest cell; determining the nearest cell as a valid cell; determining all other cells as interfering cells; and ranking each cell based on a number of grids identifying each cell as valid and a number of grids identifying each cell as an interfering cell.

In some embodiments, the method further includes obtaining grids of each interference polygon; tagging with a positive flag each valid cell grid; tagging with a negative flag each interferer cell grid; creating a matrix for each cell based on positive and negative flags; in response to a cell including more positive than negative flags, recommending the cell for an up-tilt; in response to a cell including more negative than positive flags, recommending the cell for a down-tilt; and in response to a cell including neither more negative or positive flags, recommending the cell for no tilt.

In some embodiments, the method further includes determining whether each cell recommended for up-tilt is a high-usage cell; in response to the high-usage cell being recommended for an up-tilt, determining whether a neighboring cell meets neighboring cell criteria, wherein the neighboring cell criteria includes handover attempts of greater than 50% of total handovers for the high-usage cell; a handover success rate (HOSR) of greater than 98%; and the neighboring cell is not the high-usage cell; in response to the neighboring cell meeting the neighboring cell criteria, determining whether the neighboring cell faces the high usage cell; in response to the neighboring cell facing the high usage cell, determining whether the neighboring cell is included in the interference polygons, in response to the neighboring cell being part of the interference polygons, recommending the neighboring cell be up-tilted and the high-usage cell being down-tilted.

In some embodiments, the method further includes in response to an up-tilt recommended for the cell, determining whether the cell is tilted greater than or equal to 2 degrees, in response to the cell being tilted greater or equal to 2 degrees, recommending no tilt for the cell; in response to the cell being tilted less than 2 degrees, incrementing up-tilt on the cell by UT.

In some embodiments, the method further includes in response to a cell being recommended for an down-tilt, determining whether the cell is at a maximum tilt, in response to the cell being at the maximum tilt, recommending no tilt for the cell; in response to the cell being tilted less than the maximum tilt, incrementing down-tilt on the cell by DT.

In some embodiments, an apparatus, including a processor; and a memory having instructions stored thereon that, when executed by the processor, cause the apparatus to receive inputs that include geo-located data collected over a period for a plurality of cells in a radio access network (RAN); map the geo-located data to one or more interference polygons displayed through a graphical user interface (GUI) on a user interface (UI), the interference polygons being layered above a display of a geo-location; determine a dataset of each cell included in each interference polygon displayed through the GUI; determine a total number of user samples included in each interference polygon; determine a number of user samples for each cell included in each interference polygon; in response to a first cell including less than or equal to a first threshold of the total number of user samples, determine whether the first cell is an over-shooter cell; and in response to the first cell including greater than the first threshold of the total number of user samples, determine whether the first cell is misaligned.

In some embodiments, the determination whether the first cell is the over-shooter cell further includes determine whether a second cell unintentionally received signals transmitted by the first cell; in response to the second cell unintentionally receiving signals transmitted by the first cell, determine a type of over-shooter for the first cell; and in response to the second cell not receiving signals transmitted by the first cell or receiving the signals from the first cell intentionally sent to the second cell, determine whether the first cell is misaligned.

In some embodiments, the determination the type of over-shooter for the first cell further includes determine whether the first cell is a handover cell; in response to the first cell being the handover cell, determine whether the first cell is misaligned; in response to the first cell not being the handover cell, identify the first cell as a bad over-shooter; and recommend optimization of the first cell.

In some embodiments, the determination whether the first cell is misaligned further includes determine whether the first cell includes an alignment deviation of greater than 60 degrees; in response to the first cell including the alignment deviation of greater than 60 degrees, recommend optimization of the first cell; and in response to the first cell including the alignment deviation of less than or equal 60 degrees, determine whether a first cell physical resource block (PRB) is greater than a second threshold and an IP throughput is less than a third threshold or a fourth threshold.

In some embodiments, the determination the first cell PRB is greater than the second threshold and the IP throughput is less than the third or fourth threshold further includes in response to the first cell PRB being less than or equal to the first threshold and the IP throughput being greater than or equal to the third or fourth threshold, recommend first cell optimization; and in response to the first cell PRB being greater than the first threshold and the IP throughput being less than the third or fourth threshold, divide the interference polygons into grids.

In some embodiments, a non-transitory computer readable medium having instructions stored thereon that, when executed by a processor, cause an apparatus to receive inputs that include geo-located data collected over a period for a plurality of cells in a radio access network (RAN); map the geo-located data to one or more interference polygons displayed through a graphical user interface (GUI) on a user interface (UI), the interference polygons being layered above a display of a geo-location; determine a dataset of each cell included in each interference polygon displayed through the GUI; determine a total number of user samples included in each interference polygon; determine a number of user samples for each cell included in each interference polygon; in response to a first cell including less than or equal to a first threshold of the total number of user samples, determine whether the first cell is an over-shooter cell; and in response to the first cell including greater than the first threshold of the total number of user samples, determine whether the first cell is misaligned.

In some embodiments, the determination whether the first cell is misaligned further includes determine whether the first cell includes an alignment deviation of greater than 60 degrees; in response to the first cell including the alignment deviation of greater than 60 degrees, recommend optimization of the first cell; and in response to the first cell including an alignment deviation of less than or equal 60 degrees, determine whether a first cell physical resource block (PRB) is greater than a second threshold and an IP throughput is less than a third threshold or a fourth threshold.

In some embodiments, the determination the first cell PRB is greater than the second threshold and the IP throughput is less than the third or fourth threshold further includes in response to the first cell PRB being less than or equal to the first threshold and the IP throughput being greater than or equal to the third or fourth threshold, recommend first cell optimization; and in response to the first cell PRB being greater than the first threshold and the IP throughput being less than the third or fourth threshold, divide the interference polygons into grids.

In some embodiments, the division of the interference polygons into the grids, further includes associate each grid with a nearest cell; determine the nearest cell as a valid cell; determine all other cells as interfering cells; and rank each cell based on a number of grids identifying each cell as valid and a number of grids identifying each cell as an interfering cell.

In some embodiments, the instructions further cause the processor to obtain grids of each interference polygon; tag with a positive flag each valid cell grid; tag with a negative flag each interferer cell grid; create a matrix for each cell based on positive and negative flags; in response to a cell including more positive than negative flags, recommend the cell for an up-tilt; in response to a cell including more negative than positive flags, recommend the cell for a down-tilt; and in response to a cell including neither more negative or positive flags, recommend the cell for no tilt.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method comprising:
   receiving inputs that include geo-located data collected over a period for a plurality of cells in a radio access network (RAN);
   mapping the geo-located data to one or more interference polygons displayed through a graphical user interface (GUI) on a user interface (UI), the interference polygons being layered above a display of a geo-location;
   determining a dataset of each cell included in each interference polygon displayed through the GUI;
   determining a total number of user samples included in each interference polygon;
   determining a number of user samples for each cell included in each interference polygon;
   in response to a first cell including less than or equal to a first threshold of the total number of user samples, determining whether the first cell is an over-shooter cell; and
   in response to the first cell including greater than the first threshold of the total number of user samples, determining whether the first cell is misaligned.

2. The method of claim 1, wherein the determination whether the first cell is the over-shooter cell further comprises:
   determining whether a second cell unintentionally received signals transmitted by the first cell;
   in response to the second cell unintentionally receiving signals transmitted by the first cell, determining a type of over-shooter for the first cell; and
   in response to the second cell not receiving signals transmitted by the first cell or receiving the signals from the first cell intentionally sent to the second cell, determining whether the first cell is misaligned.

3. The method of claim 2, wherein the determination the type of over-shooter for the first cell further comprises:
   determining whether the first cell is a handover cell;
   in response to the first cell being the handover cell, determining whether the first cell is misaligned;
   in response to the first cell not being the handover cell, identifying the first cell as a bad over-shooter; and
   recommending optimization of the first cell.

4. The method of claim 1, wherein the determination whether the first cell is misaligned further comprises:
   determining whether the first cell includes an alignment deviation of greater than 60 degrees;
   in response to the first cell including the alignment deviation of greater than 60 degrees, recommending optimization of the first cell; and
   in response to the first cell including the alignment deviation of less than or equal 60 degrees, determining whether a first cell physical resource block (PRB) is greater than a second threshold and an IP throughput is less than a third threshold or a fourth threshold.

5. The method of claim 4, wherein the determination the first cell PRB is greater than the second threshold and the IP throughput is less than the third or fourth threshold further comprises:
   in response to the first cell PRB being less than or equal to the first threshold and the IP throughput being greater than or equal to the third or fourth threshold, recommending first cell optimization; and in response to the first cell PRB being greater than the first threshold and the IP throughput being less than the third or fourth threshold, dividing the interference polygons into grids.

6. The method of claim 5, wherein the division of the interference polygons into the grids, further comprises:
associating each grid with a nearest cell;
determining the nearest cell as a valid cell;
determining all other cells as interfering cells; and
ranking each cell based on a number of grids identifying each cell as valid and a number of grids identifying each cell as an interfering cell.

7. The method of claim 6, further comprising:
obtaining grids of each interference polygon;
tagging with a positive flag each valid cell grid;
tagging with a negative flag each interferer cell grid;
creating a matrix for each cell based on positive and negative flags;
in response to a cell including more positive than negative flags, recommending the cell for an up-tilt;
in response to a cell including more negative than positive flags, recommending the cell for a down-tilt; and
in response to a cell including neither more negative or positive flags, recommending the cell for no tilt.

8. The method of claim 7, further comprising:
determining whether each cell recommended for up-tilt is a high-usage cell;
in response to the high-usage cell being recommended for an up-tilt, determining whether a neighboring cell meets neighboring cell criteria, wherein:
the neighboring cell criteria includes:
handover attempts of greater than 50% of total handovers for the high-usage cell;
a handover success rate (HOSR) of greater than 98%; and
the neighboring cell is not the high-usage cell;
in response to the neighboring cell meeting the neighboring cell criteria, determining whether the neighboring cell faces the high usage cell;
in response to the neighboring cell facing the high usage cell, determining whether the neighboring cell is included in the interference polygons;
in response to the neighboring cell being part of the interference polygons, recommending the neighboring cell be up-tilted and the high-usage cell being down-tilted.

9. The method of claim 8, further comprising:
in response to an up-tilt recommended for the cell, determining whether the cell is tilted greater than or equal to 2 degrees,
in response to the cell being tilted greater or equal to 2 degrees, recommending no tilt for the cell;
in response to the cell being tilted less than 2 degrees, incrementing up-tilt on the cell by UT.

10. The method of claim 8, further comprising:
in response to a cell being recommended for an down-tilt, determining whether the cell is at a maximum tilt;
in response to the cell being at the maximum tilt, recommending no tilt for the cell;
in response to the cell being tilted less than the maximum tilt, incrementing down-tilt on the cell by DT.

11. An apparatus, comprising:
a processor; and
a memory having instructions stored thereon that, when executed by the processor, cause the apparatus to:
receive inputs that include geo-located data collected over a period for a plurality of cells in a radio access network (RAN);
map the geo-located data to one or more interference polygons displayed through a graphical user interface (GUI) on a user interface (UI), the interference polygons being layered above a display of a geo-location;
determine a dataset of each cell included in each interference polygon displayed through the GUI;
determine a total number of user samples included in each interference polygon;
determine a number of user samples for each cell included in each interference polygon;
in response to a first cell including less than or equal to a first threshold of the total number of user samples, determine whether the first cell is an over-shooter cell; and
in response to the first cell including greater than the first threshold of the total number of user samples, determine whether the first cell is misaligned.

12. The apparatus of claim 11, wherein the determination whether the first cell is the over-shooter cell further comprises:
determine whether a second cell unintentionally received signals transmitted by the first cell;
in response to the second cell unintentionally receiving signals transmitted by the first cell, determine a type of over-shooter for the first cell; and
in response to the second cell not receiving signals transmitted by the first cell or receiving the signals from the first cell intentionally sent to the second cell, determine whether the first cell is misaligned.

13. The apparatus of claim 12, wherein the determination the type of over-shooter for the first cell further comprises:
determine whether the first cell is a handover cell;
in response to the first cell being the handover cell, determine whether the first cell is misaligned;
in response to the first cell not being the handover cell, identify the first cell as a bad over-shooter; and
recommend optimization of the first cell.

14. The apparatus of claim 11, wherein the determination whether the first cell is misaligned further comprises:
determine whether the first cell includes an alignment deviation of greater than 60 degrees;
in response to the first cell including the alignment deviation of greater than 60 degrees, recommend optimization of the first cell; and
in response to the first cell including the alignment deviation of less than or equal 60 degrees, determine whether a first cell physical resource block (PRB) is greater than a second threshold and an IP throughput is less than a third threshold or a fourth threshold.

15. The apparatus of claim 14, wherein the determination the first cell PRB is greater than the second threshold and the IP throughput is less than the third or fourth threshold further comprises:
in response to the first cell PRB being less than or equal to the first threshold and the IP throughput being greater than or equal to the third or fourth threshold, recommend first cell optimization; and
in response to the first cell PRB being greater than the first threshold and the IP throughput being less than the third or fourth threshold, divide the interference polygons into grids.

16. A non-transitory computer readable medium having instructions stored thereon that, when executed by a processor, cause an apparatus to:
- receive inputs that include geo-located data collected over a period for a plurality of cells in a radio access network (RAN);
- map the geo-located data to one or more interference polygons displayed through a graphical user interface (GUI) on a user interface (UI), the interference polygons being layered above a display of a geo-location;
- determine a dataset of each cell included in each interference polygon displayed through the GUI;
- determine a total number of user samples included in each interference polygon;
- determine a number of user samples for each cell included in each interference polygon;
- in response to a first cell including less than or equal to a first threshold of the total number of user samples, determine whether the first cell is an over-shooter cell; and
- in response to the first cell including greater than the first threshold of the total number of user samples, determine whether the first cell is misaligned.

17. The non-transitory computer readable medium of claim 16, wherein the determination whether the first cell is misaligned further comprises:
- determine whether the first cell includes an alignment deviation of greater than 60 degrees;
- in response to the first cell including the alignment deviation of greater than 60 degrees, recommend optimization of the first cell; and
- in response to the first cell including an alignment deviation of less than or equal 60 degrees, determine whether a first cell physical resource block (PRB) is greater than a second threshold and an IP throughput is less than a third threshold or a fourth threshold.

18. The non-transitory computer readable medium of claim 17, wherein the determination the first cell PRB is greater than the second threshold and the IP throughput is less than the third or fourth threshold further comprises:
- in response to the first cell PRB being less than or equal to the first threshold and the IP throughput being greater than or equal to the third or fourth threshold, recommend first cell optimization; and
- in response to the first cell PRB being greater than the first threshold and the IP throughput being less than the third or fourth threshold, divide the interference polygons into grids.

19. The non-transitory computer readable medium of claim 18, wherein the division of the interference polygons into the grids, further comprises:
- associate each grid with a nearest cell;
- determine the nearest cell as a valid cell;
- determine all other cells as interfering cells; and
- rank each cell based on a number of grids identifying each cell as valid and a number of grids identifying each cell as an interfering cell.

20. The non-transitory computer readable medium of claim 19, wherein the instructions further cause the processor to:
- obtain grids of each interference polygon;
- tag with a positive flag each valid cell grid;
- tag with a negative flag each interferer cell grid;
- create a matrix for each cell based on positive and negative flags;
- in response to a cell including more positive than negative flags, recommend the cell for an up-tilt;
- in response to a cell including more negative than positive flags, recommend the cell for a down-tilt; and
- in response to a cell including neither more negative or positive flags, recommend the cell for no tilt.

* * * * *